3,346,132
LOAD SHIFTING MECHANISM
Stephen Duszka, 503 McCarter Highway,
Newark, N.J. 07102
Filed Sept. 28, 1965, Ser. No. 490,948
7 Claims. (Cl. 214—516)

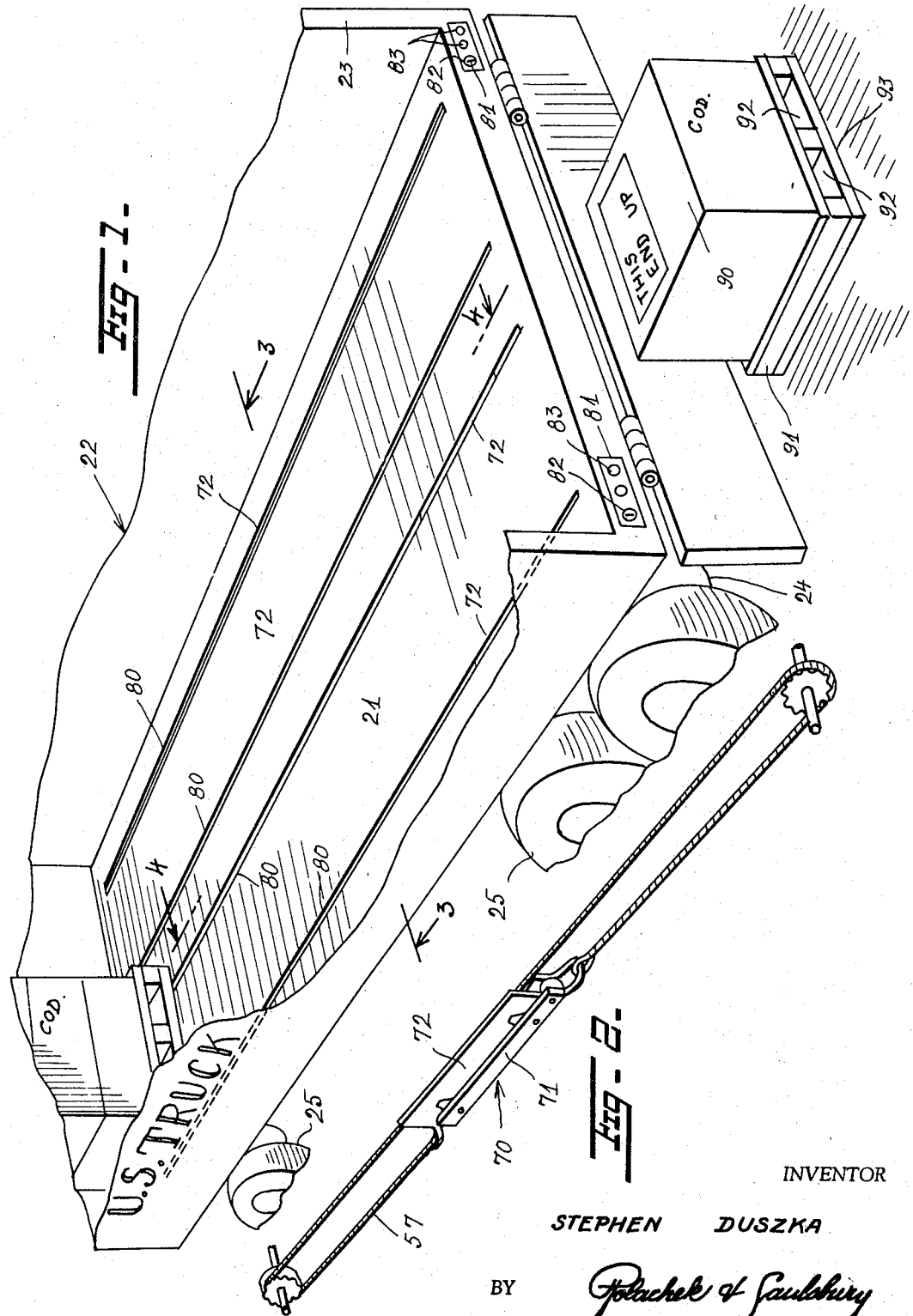

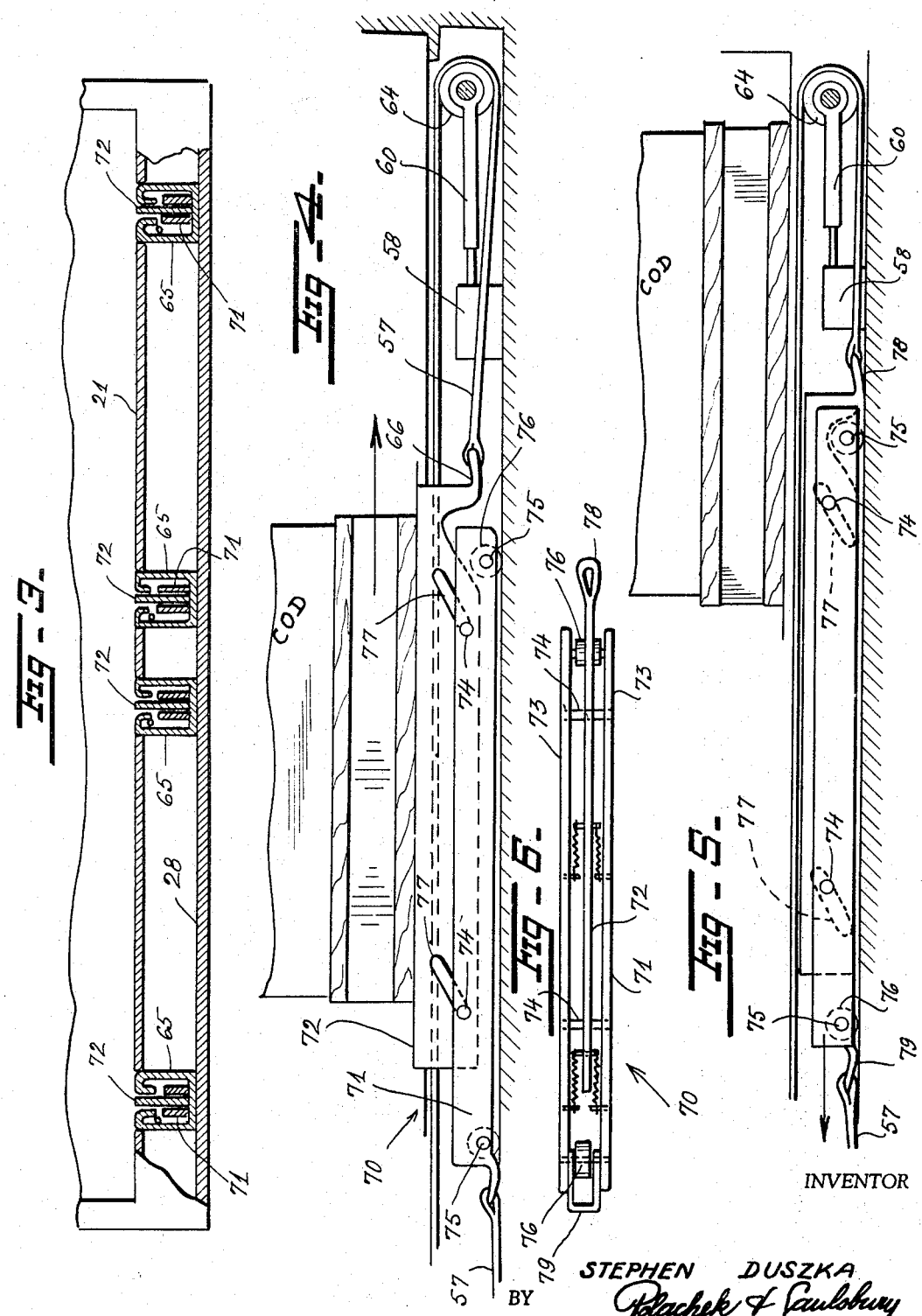

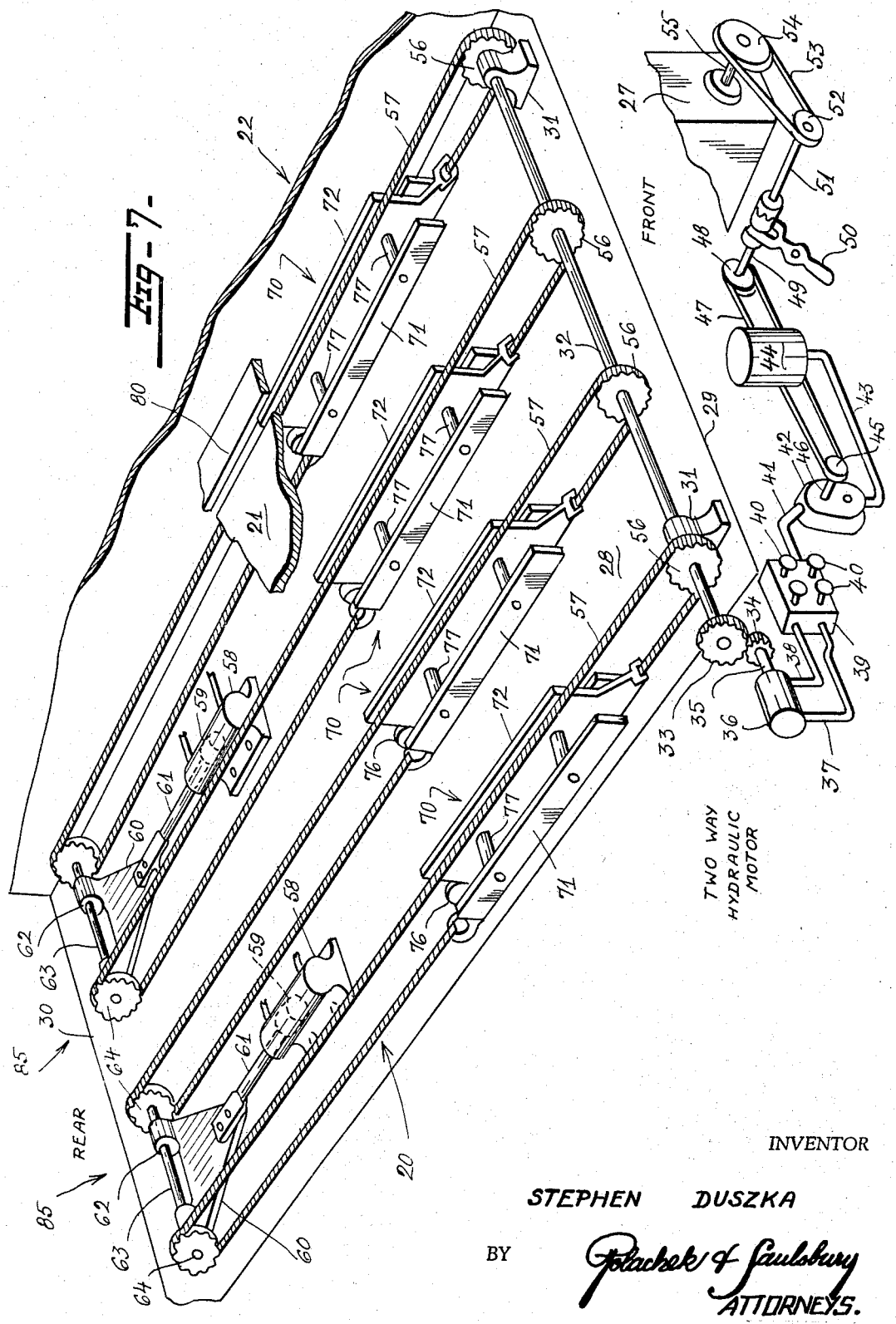

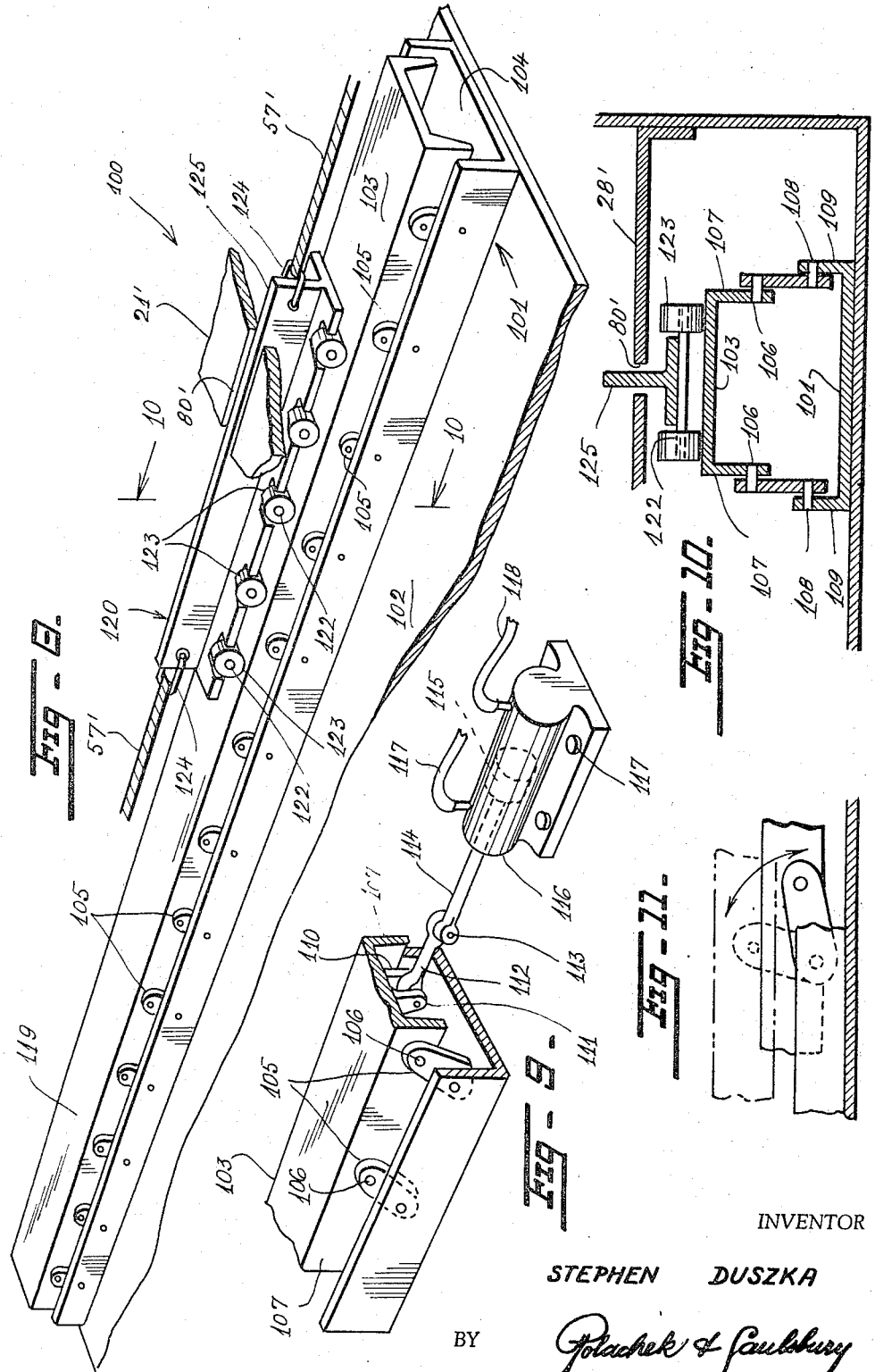

This invention relates generally to loading devices for automotive trucks. More specifically it relates to freight moving devices which are contained within the automotive trucks.

It is generally well known to those skilled in the art that the shifting and moving of particularly heavy freight between the front and rear of a truck body can be very difficult and laborious when attempted to be done by manual means. During loading operation the freight must be moved from the doorway to the remote corners and areas away from the door. Additionally this is time consuming when done manually and further it can be dangerous to cause injury to a person's hands or toes. All these features are of course objectionable.

Accordingly it is a principal object of the present invention to provide an automotive truck having a self-contained truck loading apparatus for shifting freight between opposite ends of the truck body or box.

Another object is to provide a truck loading apparatus having means for moving freight in either direction thus helping in loading and unloading of the truck.

Another object is to provide a truck loading apparatus having means to move freight between any two points intermediate the opposite ends of the truck.

Still another object is to provide a truck loading apparatus which is completely retractable out of the way when not in use and which will not take away any space within the truck box.

Still another object is to provide a truck loading apparatus that can be electrically controlled by an operator standing outside of the truck box and which need not necessarily have a workman present within the truck box for aligning freight units adjacent to each other, the same being accomplished by the present device.

Still another object is to provide a truck loading device that may be built into any type of truck, whether it has a closed box or whether it is an open flat bed type, and which with certain additional structure would be adaptable even for heavy machinery transporting trucks wherein the rear floor area is rearwardly downwardly arched.

Still another object is to provide a loading apparatus which is adaptable to be built into truck trailers, Other objects are to provide a truck loading apparatus that is simple in design, inexpensive to manufacture, These and other objects will be readily evident upon a study of the following specification and the accompanying drawings wherein:

FIGURE 1 is a fragmentary rear perspective view of a truck shown incorporating the present invention, FIG. 2 is a fragmentary perspective view of one of the load moving units shown principally hidden in FIG. 1, FIG. 3 is a cross sectional view taken on line 3—3 of FIG. 1, FIG. 4 is a cross sectional view taken on line 4—4 of FIG. 1 showing the device in an operative position transporting a load of freight, FIG. 5 is a view similar to FIG. 4 showing the device in an inoperative position, FIG. 6 is a top plan view of one of the sliding shoes, FIG. 7 is a fragmentary perspective view of a truck showing the floor partly broken away to illustrate the truck loading apparatus therebelow, FIG. 8 is a perspective view of a modified type of truck loading apparatus construction shown fragmentarily, FIG. 9 is a perspective view of an elevating mechanism used in conjunction with the device shown in FIG. 8, FIG. 10 is a cross sectional view taken on line 10—10 of FIG. 8, and FIG. 11 is a cross sectional view taken on line 11—11 of FIG. 8 showing the device in descended position.

Referring now to the drawing in detail, the numeral 20 represents a truck loading apparatus according to the present invention which is mounted under the floor 21 of a truck box or body 22.

The truck box is provided in a conventional manner with a doorway 23 which may be at either the sides or at the rear as shown in FIG. 1, and through which freight is passed during loading and unloading operation.

The truck is provided with conventional chassis 24 mounted upon wheels 24, a tailgate 26, a cab (not shown) and truck engine 27.

A platform 28 is provided in spaced apart relation under the floor 21 (as shown in FIG. 7) and upon which the truck loading apparatus is mounted.

In the example illustrated in the present case, and as shown in FIG. 7, the edge 29 of the platform is at the front end of the truck, and the edge 30 is at the rear thereof, the truck body having the doorway 23 also at the rear as shown on FIG. 1.

A pair of brackets 31 are mounted spaced apart on the platform 28 near the front end thereof and a transverse shaft 32 is supported therebetween. A gear 33 is mounted on one end of the shaft, the gear being in engagement with a gear 34 mounted on a motor shaft 35 of a hydraulic two way motor 36.

The hydraulic motor 36 is activated by hydraulic fluid movable thereinto through tubes 37 and 38 at each end of the motor. The tubes are connected at their opposite ends to a valve unit 39 having four hand valves 40 for closing and opening separate valves to allow the fluid to move in either direction in each of the tubes thereby causing the shaft to rotate in either direction as desired. A pipe 41 communicates between the valve unit and a pump 42. Another pipe 43 communicates between the pump and an oil reservoir 44.

The pump is powered by means of a pulley 45 on pump shaft 46, the pulley being driven by an endless belt 47 passing over a pulley 48 on shaft 49. Shaft 49 is driven through a clutch mechanism 50 by shaft 51 which in turn is driven by a pulley 52 on shaft 51, endless belt 53 and pulley 54 on an output shaft 55 of the truck engine 27.

Four gears 56 are mounted on shaft 32 over which chains 57 are driven. Near the rear of the platform 28 a pair of hydraulic cylinders 58 are mounted and within each of which a piston 59 is movable in a rearward and forward direction. A triangular bracket 60 secured to each piston rod 61 carried by the piston 59 has bearing openings 62 in which a shaft 63 is supported freely rotatably. A pair of gears 64 is mounted on each shaft 63 and chains 57 are passed around the gears 64. Each end of the chains 57 are connected to an elevator unit 70.

Each elevator unit comprises a frame 71 and a shoe 72. The frame is comprised of a pair of spaced apart bars 73 secured together by means of cross pins 74 and 75 as shown in FIGS. 4, 5 and 6. A roller 76 is mounted freely rotatable on cross pins 75 for allowing frictionally free movement of the frame within a channel 65 shown in FIG. 3. The channels 65 are mounted on platform 28.

The shoe 72 comprises a plate having a pair of diagonal slots 77 through each of which one of the cross pins 74 extends. Thus the shoe is movable in a diagonally vertical and horizontal direction respective to the frame. A lug 78 at one end of the shoe provides anchor means for one end of chain 57 and a lug 79 at the opposite end of the frame provides anchor means for the opposite end of the chain.

The floor 21 of the truck body has a plurality of slots 80 through which the shoe can protrude upwardly when moved diagonally upward.

It is to be understood that the hydraulic cylinders 58 include pump and valve control mechanisms similar to that of the motor 36 and each cylinder can be controlled from a panel 81 at the doorway 23 from where an operator can control movement of freight. Each control panel can include a mechanism lock 82 if preferred and valve buttons 83, as shown in FIG. 1.

In operative use the diagonally upward or downward position of the shoe is controlled by the tension on chains 57 provided by cylinder 58. Upon throwing then the clutch 50 into engagement, the gears 56 on shaft 32 are driven causing the chains to move and pull the pairs of elevators associated with each loading unit 85 having one hydraulic cylinder 58. In operative use, the freight 90 is placed on pallets 91 which are then lifted by fork lifting trucks placing fork prongs into openings 92 of the pallet. The pallet and freight thereupon are placed upon the floor 21 of the truck body in a position so that the pallet bottom panel 93 straddles a pair of slots 80 of one unit 85. By tensioning the chains of the particular unit as above described, the shoe is lifted raising the pallet above the floor. Then by engaging the clutch the pallet is carried into the truck away from the doorway.

In a modified construction shown in FIG. 8, an apparatus 100 is shown which is designed for particularly heavy freight.

The apparatus 100 includes a stationary channel 101 mounted on panel 102. An inverted channel 103 is carried within the trough 104 of channel 101.

A plurality of spaced apart links 105 are mounted at their one ends on pins 106 secured in the sides 107 of channel 103. The opposite ends of the links are mounted on pins 108 secured in sides 109 of channel 101. Lugs 110 on the underside of channel 103 are connected through a pin 111 to one end of arm 112 which is connected at its other end by a pin 113 to a piston rod 114 at the end of which there is a piston head 115 slidable within a cylinder 116 secured by means of bolts 117 to the channel 101. Pipes 117 and 118 at each end of the cylinder communicate with a source of oil, pump and valves (not shown).

The upper side 119 of the channel 103 is flat and provides a surface upon which a skate 120 may travel.

The skate 120 comprises an inverted T-shaped beam 121 supported by means of shafts 122 upon a plurality of rollers 123. At each end of the skate there is a clip 124 to each of which one end of chain 57' is secured.

In operative use, movement of oil in cylinder 116 causes channel 103 to be pulled or pushed away. This channel being connected by links 105 to the stationary channel is thus caused to be raised or lowered, thus causing the upstanding plate 125 of the T-shaped beam to be lifted or lowered through the slot 80' in floor 21', as shown in FIG. 11.

It is to be understood that the platforms 28 or 102 may be substituted by suitable brackets for supporting the various underfloor mechanism if so preferred.

While various changes may be made in the detail construction it is understood that such changes will be within the spirit and scope of the present invention as defined by the appended claims.

What is claimed is:

1. In a truck loading device the combination with a truck body of a floor on said body, openings through said floor communicating with a plurality of loading units below said floor, each of said units including means that may be lifted upwardly through said openings in said floor for engaging the underside of a pallet bearing freight and means for moving said pallet from one area of said truck body to another area thereof, wherein each of said openings in said floor comprises a longitudinal slot extending between an area adjacent a doorway on said truck body and a remote area therefrom, and said liftable means is slidable within each of said slots to deliver said pallet bearing freight from said doorway to said remote area during loading operation, and from said remote area to said doorway during unloading operation, wherein each of said loading units comprises a pair of chains carried over a pair of gears at each end of said truck body, each of said chains being connected at its opposite ends to said liftable means, drive means for providing power to move said liftable means along said slots, and tension means to selectively raise said liftable means.

2. In a truck loading device the combination with a truck body of a floor on said body, openings through said floor communicating with a plurality of loading units below said floor, each of said units including means that may be lifted upwardly through said openings in said floor for engagement with the underside of a pallet bearing freight and means for moving said pallet from one area of said truck body to another area thereof, wherein each of said openings in said floor comprises a longitudinal slot extending between an area adjacent a doorway on said truck body and a remote area therefrom, and said liftable means is slidable within each of said slots to deliver said pallet bearing freight from said doorway to said remote area during loading operation, and from said remote area to said doorway during unloading operation, wherein each of said loading units comprises a pair of chains carried over a pair of gears at each end of said truck body, each of said chains being connected at its opposite ends to said liftable means, drive means for providing power to move said liftable means along said slots, and tension means to selectively raise said liftable means, wherein said liftable means comprises an elevator unit, said elevator unit including a horizontal frame and a shoe, means to move said shoe diagonally upwardly relative to said frame, one end of said chain being connected to said shoe and the other end of said chain being connected to said frame.

3. In a truck loading device the combination as set forth in claim 2, wherein said frame comprises a pair of spaced apart bars, two pairs of fins between said bars, rollers on one pair of said fins to provide friction free movement of said bar within a channel track, a pair of diagonally inclined slots in said shoe, said shoe being positioned between said bars and said second pair of pins extending through said diagonally inclined slots.

4. In a truck loading device the combination as set forth in claim 3, wherein said diagonally inclined slots extend in a combined horizontal and vertical direction.

5. In a truck loading device the combination as set forth in claim 4, wherein said tension means comprises a hydraulic cylinder securely mounted on said truck body, a piston within said cylinder, a triangular bracket secured to a piston rod on said piston, bearing means within said triangular bracket, a cross shaft carried within said bearing means and one of said gears carrying each of said chains being mounted at each end of said cross shaft.

6. In a truck loading device the combination as set forth in claim 1, wherein said liftable means comprises a longitudinal stationary channel positioned with its trough facing upwardly, a movable channel positioned with its trough facing downwardly, said movable channel being located within said trough of said stationary channel, a plurality of spaced apart links pivotally mounted at their upper ends to said movable channel and pivotally mounted at their lower ends to said stationary channel, lug means on the underside of said movable channel, a pivotable arm connected at one end to said lug means and connected at its opposite end to a piston rod having a piston head within a hydraulic cylinder mounted stationarily in said trough of said stationary channel.

7. In a truck loading device the combination as set forth in claim 6, wherein said liftable means further includes a skate movable on the upper side of said movable channel, said chain being connected at each of its ends to one of the ends of said skate, said skate comprising a T-shaped beam having a plurality of spaced apart rollers mounted on cross pins to provide friction free movable channel.

References Cited

UNITED STATES PATENTS

| | | | |
|---|---|---|---|
| 2,058,729 | 10/1936 | Sekulski | 214—16.4 |
| 2,339,288 | 1/1944 | Norbom | 214—516 |
| 2,693,286 | 11/1954 | Cooks | 214—84 |

GERALD M. FORLENZA, *Primary Examiner.*

ALBERT J. MAKAY, *Examiner.*